United States Patent

Smith

[15] 3,679,187
[45] July 25, 1972

[54] AIR DIFFUSION APPARATUS FOR THE TREATMENT OF POLLUTED WATER

[72] Inventor: Mansel W. Smith, 1203 Dwyce Drive, Austin, Tex. 78757

[22] Filed: June 3, 1970

[21] Appl. No.: 43,147

[52] U.S. Cl. ............................................261/123, 261/124
[51] Int. Cl. ..........................................................B01f 3/04
[58] Field of Search......................261/123, 124, 77, 121 R; 210/220

[56] References Cited

UNITED STATES PATENTS

| | | | |
|---|---|---|---|
| 2,218,635 | 10/1940 | Borge | 261/122 |
| 2,510,427 | 6/1950 | Soucie | 261/124 |
| 2,430,749 | 11/1947 | Denburg | 261/122 |
| 2,540,948 | 2/1951 | Jeffery | 261/124 |
| 3,163,684 | 12/1964 | Gilbert | 261/124 |
| 166,508 | 8/1875 | Daschbach | 261/123 |
| 1,154,507 | 9/1915 | Gorton | 261/123 |
| 3,153,682 | 10/1964 | Walker | 261/124 |
| 1,214,637 | 2/1917 | Zistel | 261/124 |
| 3,592,450 | 7/1971 | Rippon | 261/123 |
| 2,616,676 | 11/1952 | Walker | 261/124 |
| 1,039,013 | 9/1912 | Berryman | 261/124 |

FOREIGN PATENTS OR APPLICATIONS

| | | | |
|---|---|---|---|
| 302,750 | 7/1968 | Sweden | 261/123 |
| 1,088,218 | 10/1967 | Great Britain | 261/123 |

Primary Examiner—Tim R. Miles
Attorney—R. H. Galbreath

[57] ABSTRACT

A plurality of substantially similar vertical air diffusion units suspended in spaced relation, and served by a common air supply manifold. Each unit embodying a vertical open-bottomed injection pipe extending downwardly and discharging into the tank liquor. The units being provided with individual orifice fittings which are preset so that the air discharging from all of the pipes will be distributed accordingly. The lower discharge extremities of the pipes, being vertically slotted, circumferentially distribute the discharging air and being provided with bubble deflectors above the slots to distribute and break up the coarse air bubbles arising from open slots. An elongated cleaning rod is provided for insertion down the injection pipes for the occasional removal of undesirable debris.

3 Claims, 8 Drawing Figures

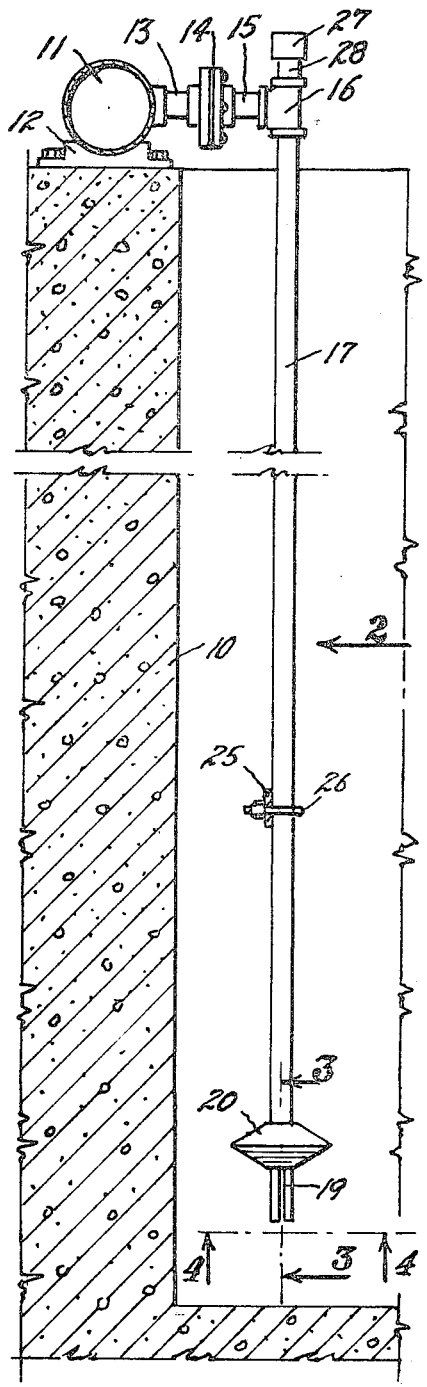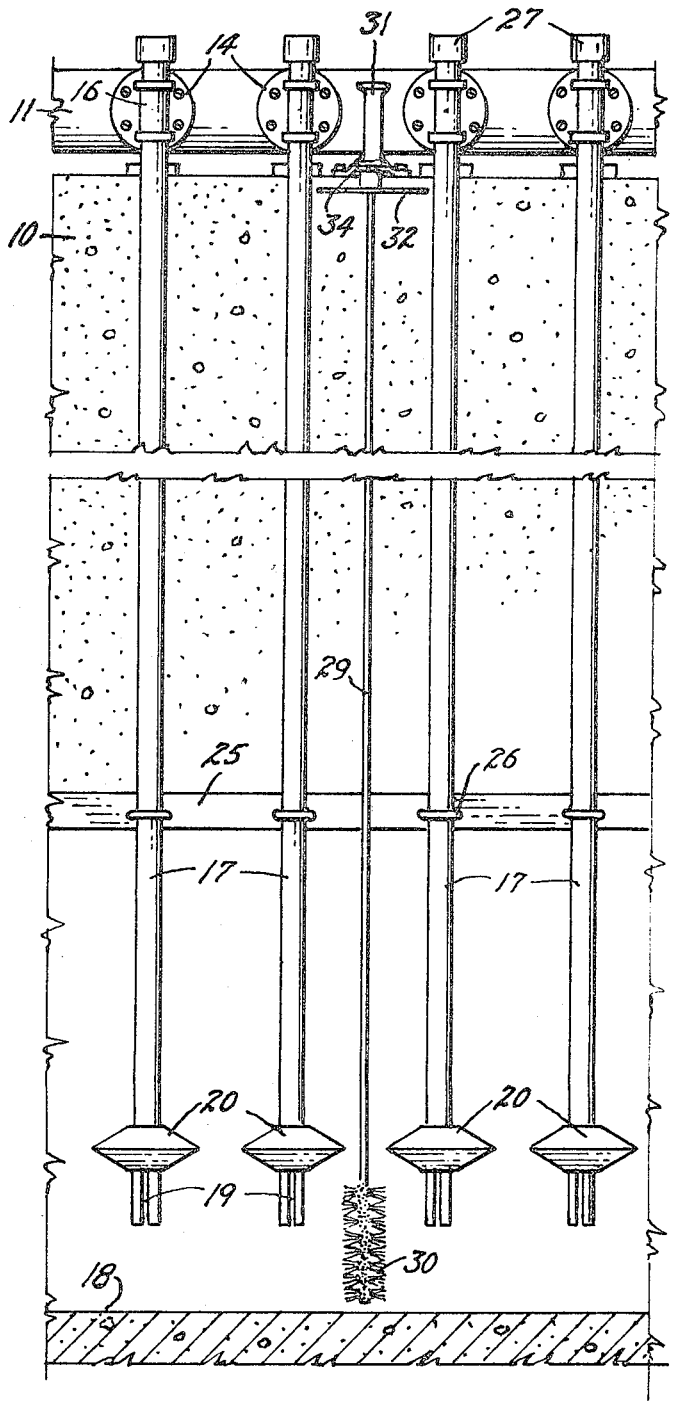

PATENTED JUL 25 1972
3,679,187
SHEET 2 OF 2
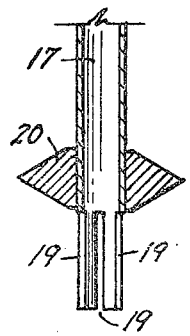
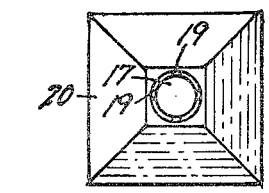
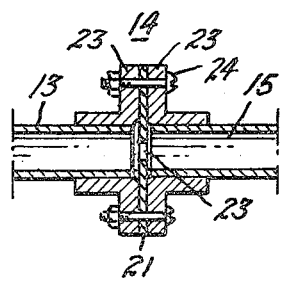
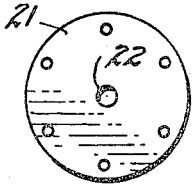
Fig.3  Fig.4  Fig.5  Fig.6
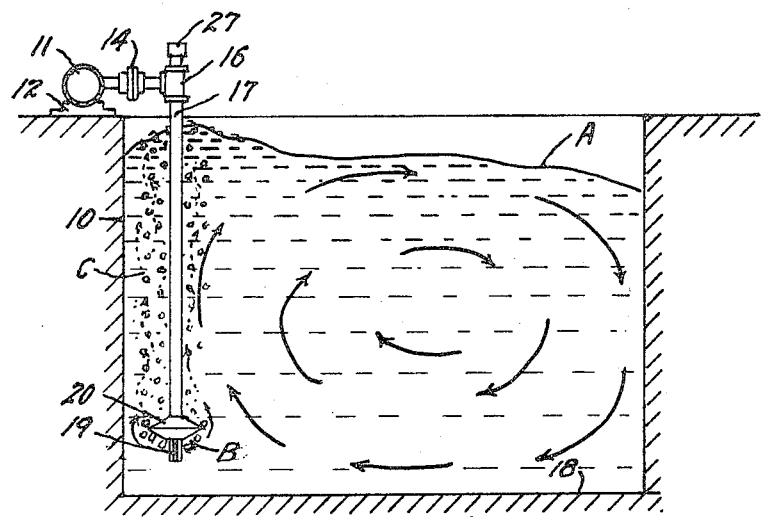
Fig.7
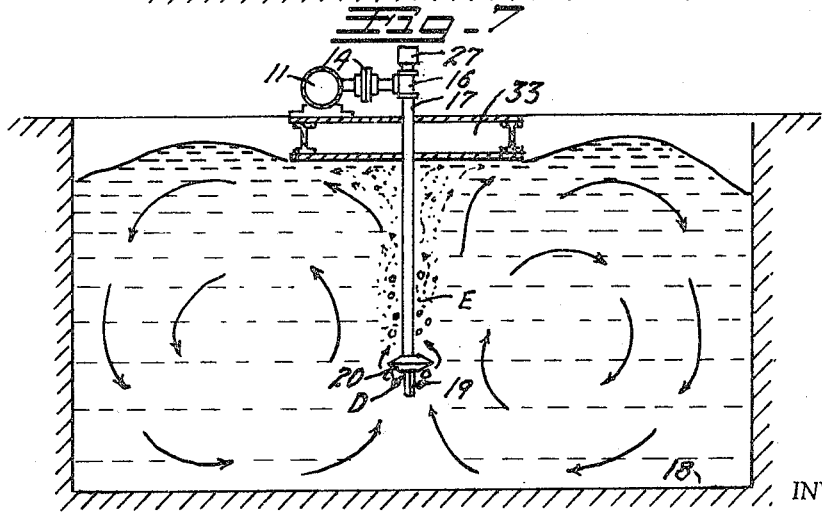
Fig.8
INVENTOR.
MANSEL W. SMITH
BY
*P.H. Galbraith*
ATTORNEY

AIR DIFFUSION APPARATUS FOR THE TREATMENT OF POLLUTED WATER

The pollution of natural waterways by sewage and industrial waste has become a grim serious national problem. Many lakes and streams have become so polluted that the fish have been killed and bathing beaches have been closed. The pollutants have drawn the oxygen from the water so that the beneficial microbes cannot live, and the rivers have lost their powers of oxygenation and self purification. Bubbles of gas rise from the bottom, scum forms on the surface and the banks, the water is gray and putrid and the river becomes, in effect, a septic tank from lack of oxygen. This invention relates to means for restoring the necessary oxygen to the water so that the power of self-purification will be restored thereto.

The principal object of the invention is to provide a highly efficient and exceedingly economical air diffusion apparatus which will diffuse air uniformly throughout a body of polluted water by bringing the water into intimate molecular contact with the air so that the oxygen void is quickly and continuously restored.

Another object is to provide efficient and versatile air diffusion apparatus which is readily applicable to conventional sewage aeration tanks of various shapes and sizes at minimum installation costs.

A further object is to provide a diffuser system having a plurality of air conduits independently discharging into the liquid mass in which the discharges of all the conduits will be controlled as to quantity and pressure so that the desirable air release pattern will be maintained in the mass being treated.

A still further object is to provide an air diffuser which will usually be self-cleaning but which, should it become necessary, may be quickly and easily cleaned without shutting down operation.

Other objects and advantages reside in the detail construction of the invention, which is designed for simplicity, economy, and efficiency. These will become more apparent from the following description.

In the following detailed description of the invention, reference is made to the accompanying typical drawings which form a part hereof. Like numerals refer to like parts in all views of the drawings and throughout the description.

In the drawing:

FIG. 1 is a fragmentary vertical section through a side wall of a conventional spiral roll type aeration tank illustrating a side elevational view of an air dispersion unit, to be later described, applied thereto;

FIG. 2 is a fragmentary elevational view, looking in the direction of arrow "2" in FIG. 1, showing a plurality of the air dispersion units applied to the side wall;

FIG. 3 is an enlarged detail section taken on the line 3—3, FIG. 1;

FIG. 4 is a detail bottom view looking upwardly on the line 4—4, FIG. 1;

FIG. 5 is a fragmentary, detail axial section through a fixed-orifice fitting to be later described;

FIG. 6 is a detail face view of an orifice plate employed in the fitting of FIG. 5;

FIG. 7 is a diagrammatic cross section through a typical conventional spiral roll aeration tank with this invention applied thereto, showing the fluid flow paths therein; and FIG. 8 is a similar diagrammatic cross-sectional view through a typical conventional double-roll or cross-roll aeration tank with this invention applied thereto, showing the fluid flow paths therein.

The complete air diffusion apparatus comprises a plurality of the assembled units, such as shown in FIG. 1, arranged along a tank wall 10, such as shown in FIG. 2. The units are connected in horizontally spaced relation to an air manifold 11 supplied with compressed air from a suitable source and typically supported upon the wall 10 in any suitable manner such as by means of anchored pipe saddles 12.

The units are similar and, as illustrated, each comprises a first nipple 13, threaded into or formed on the manifold 11, which supports an orifice fitting 14, to be later described. A second nipple 15 extends from the fitting 14 into the side outlet of a vertically positioned tee 16. An air injection pipe 17 extends vertically downwardly from the tee 16. The length of the injection pipe 17 depends upon the depth of the tank, but should be such that the injection pipe terminates above and in relatively close relation to the tank bottom, indicated at 18.

The lower end of the injection pipe 17 is permanently open and four open ended, vertical, air release slots 19 are formed in the pipe wall about the open end thereof in equally spaced relation and extending vertically upward a distance approximately equalling three times the O.D. of the pipe 17.

A square bubble deflector 20 is permanently affixed to the injection pipe 17 immediately above the upper extremities of the slots 19 so that the middle of each of the deflectors four sides will be vertically aligned with one of said slots. The bottom of the deflector 20 has a truncated pyramidal shape so as to produce four flat, inclined, triangular lower surfaces each extending axially inward and downward from one of the four sides as shown in FIGS. 3 and 4. The top of the deflector 20 is similar to the bottom but is vertically reverse, that is, it has four similar flat, inclined, upper surfaces extending inwardly and upwardly from the sides. This provides a deflector of greater thickness at the center with four relatively sharp straight sides positioned respectively above the four air release slots 19. The deflector 20 is preferably square with four straight sides, each side being positioned medially above one of the four slots. It is conceivable that it could have five or more straight sides, with the number of slots similarly increased so that each side will be medially positioned above a slot.

The orifice fitting 14 may have any suitable construction which will provide an air orifice of prefixed diameter. As illustrated, it comprises a circular orifice plate 21, having a preset axial orifice 22, clamped between, and seated to, two flanged couplings 23 by means of suitable clamp screws 24. The nipples 13 and 15 are respectively threaded into the flanged couplings 23 and extend oppositely outward therefrom to the manifold 11 and the tee 16. A third nipple 28 projects upwardly from the main run of the tee 16 and the top of the nipple is closed by any suitable, removable closure such as a conventional pipe cap 27.

The above described assembled units are designed to be fixedly installed in any conventional polluted water tank or conduit, of the type having either sloped or straight vertical walls, by conveniently mounting the manifold 11 to efficiently supply air to the injection pipes 17 extending vertically downward in uniformly spaced relation and in a common plane parallel or perpendicular to, and spaced from, the side wall as typically shown in FIG. 2 and 7. The injection pipes of the units are preferably maintained in accurate alignment by means of an elongated frame member 25 to which they are attached by means of suitable U-bolts 26.

A cleaning rod 29 of greater length than the injection pipes 17, is furnished for occasional use. The cleaning rod 29 is provided with a cylindrical brush 30 at its lower extremity and with a suitable handle 31 and a splash shield 32 at its upper extremity. For convenience, the cleaning rod may be removably suspended by any suitable support 34 on the tank wall, as shown in FIG. 2. The use of the cleaning rod will be later described.

OPERATION

Let us assume that the tank is substantially filled with polluted water or aeration tank liquor, as indicated at "A" in FIG. 7, and that air is being admitted, under pressure, to the manifold 11. The air will discharge from the lower extremities of the injection pipes, through the air slots 19 therein, in the form of relatively coarse air bubbles, as indicated at "B", which will arise, strike and ride upwardly against the inclined bottom surfaces of the deflectors 20. The contact with deflectors shear, deflect, and disperse the bubbles so that they will rise from the deflectors in uniform molecularly dispersed condition. The combination of the air slots 19 and the deflectors 20 creates optimum air bubble dispersion and shear to maintain uniform and overlapping air distribution around the injection pipes 17.

The orifices 22 in the orifice plates 21 of each individual orifice fitting 14 have been preset to the particular job requirements so that the air discharging from all of the injection pipes will be distributed accordingly regardless of its position along the manifold 11 and regardless of differences in submersion. It will be noted that the orifice fittings are positioned above the fluid level which prevents fouling from tank debris.

Thus, a relatively thick, dense, uniform, curtain of massed bubbles is arising throughout the entire length of the diffusion system as indicated at "C". This creates a hydraulic unbalance in the tank so that the entire contents thereof rotate, as indicated by the arrows in FIG. 7, to repeatedly bring the water molecules into constant and intimate contact with bubbles of air to rapidly oxidize and purify the tank contents.

It will be noted that the orifice plates can be interchanged to properly adjust the original presetting without draining the tank and that once the proper orifice plates 21 have been set for a particular tank they will permanently remain in place so that the tank will operate at maximum efficiency without further attention whenever the air supply is turned on.

The above described diffusion apparatus is practically self cleaning for the injection pipes will fill with tank liquor when the air supply pressure is shut off and, when the air supply is restored, the liquor will be violently discharged downwardly through the open ends and through the release slots 19 into the tank to effectively remove any suspended debris from the pipes.

However, should clogs occasionally occur the caps 27 can be quickly removed from the troublesome units and the clogs can be readily removed by inserting the cleaning rod 29 downwardly in the clogged injection pipes so that the bristles of the brush 30 will extend outwardly through the slots 19 to effectively remove any adhering stringy material or tenacious coatings. The latter occasional cleaning can be done without stopping operation of the diffusion apparatus since the restricting air orifice 14 and the shield 32 on the cleaning rod 29 prevents objectionable pneumatic blowing, loss of air or throwing of debris from the units being cleaned so that individual shutoff valves are unnecessary.

The above described installation is suitable for most elongated rectangular tanks having a cross section substantially similar to that shown in FIG. 7. If wider tanks are to be used an alternate installation such as diagrammed in FIG. 8 may be used having a manifold support or structural walkway 33 extending longitudinally and medially of the tank, being intermittently supported as required. The manifold 11 and the dispersion pipes are mounted on the walkway or otherwise supported instead of on the tank wall as above described. The injection pipes 17 extend downwardly in uniformly spaced relation on the center line of the tank similarly to the manner in which the injection pipes are positioned adjacent the tank wall in the previously described installation. The operation and construction of the units is similar to the previously described form. The air discharging from the slots 19 in the lower extremities of the injection pipes, as indicated at "D" in FIG. 8, is dispersed by the bubble deflectors 20 and arises in dense overlapping colums of miniature bubbles, as indicated at "E", surrounding each of the pipes 17. Bubbles do not normally emit from the open bottoms of the diffusion pipes 17 since the slots 19 are designed to pass the full volume of discharging air. The injection pipes are relatively closely spaced (in actual practice from 9 to 18 inches) so that the columns of bubbles around the pipes enter and engage the adjacent bubble columns to form a uniform, continuous curtain or wall of bubbles forwardly of the tank wall in the installation of FIGS. 1 and 7 and a continuous uniform, dense, dividing wall of bubbles down the middle of the tank in the installation of FIG. 8.

The dividing wall of bubbles in FIG. 8 creates a hydraulic unbalance in both sides of the tank with the entire contents travelling upwardly at the center of the tank and downwardly at both side walls thereof, as indicated by the arrows in FIG. 8, to maintain intimate and continuous contact between the air and the tank liquor.

While a selected form of the invention has been above described, it is understood that mechanical variations and detail substitutions can be made by one skilled in the art without departing from the spirit of the invention.

Having thus described the invention what is claimed and desired to be secured by Letters Patent is:

1. Means for restoring oxygen to a mass of polluted water in an aeration tank comprising:
   a. a substantially horizontal, compressed air charged manifold extending over the mass;
   b. a plurality of air injection pipes in communication with and extending downwardly from said manifold into said mass;
   c. a bubble deflector comprising a multi-straight-sided block axially secured to and extending radially outward about each injection pipe adjacent to and in vertically spaced relation with the lower extremity of the latter; and
   d. air release means in the wall of each injection pipe, said release means comprising four equally spaced, vertical slots extending upwardly from the lower extremities of each injection pipe to a plane below the bubble deflectors thereon, so that bubbles arising from said slots will pass medially over the straight sides of said block and will be broken up and distributed by said deflector, said bubble deflectors being square in plan to provide four similar sides, each side being medially aligned with one of said slots.

2. Means for restoring oxygen as described in claim 1 in which:
   a. the bottom of the bubble deflector has a truncated pyramidal shape which provides four flat, inclined triangular lower surfaces each extending axially inward and downward from one of said four sides to uniformly gravitate bubbles from said slots outwardly and upwardly over said sides.

3. Means for restoring oxygen as described in claim 2 in which:
   a. the top of the bubble deflector also has a truncated pyramidal shape which provides four flat, inclined upper surfaces each extending axially inward and upward from one of said four sides to the respective injection pipe to gravitationally direct bubbles toward said pipe.

* * * * *